Feb. 11, 1958     G. B. KELLY ET AL     2,822,639
ANIMAL TRAP
Filed Nov. 18, 1954
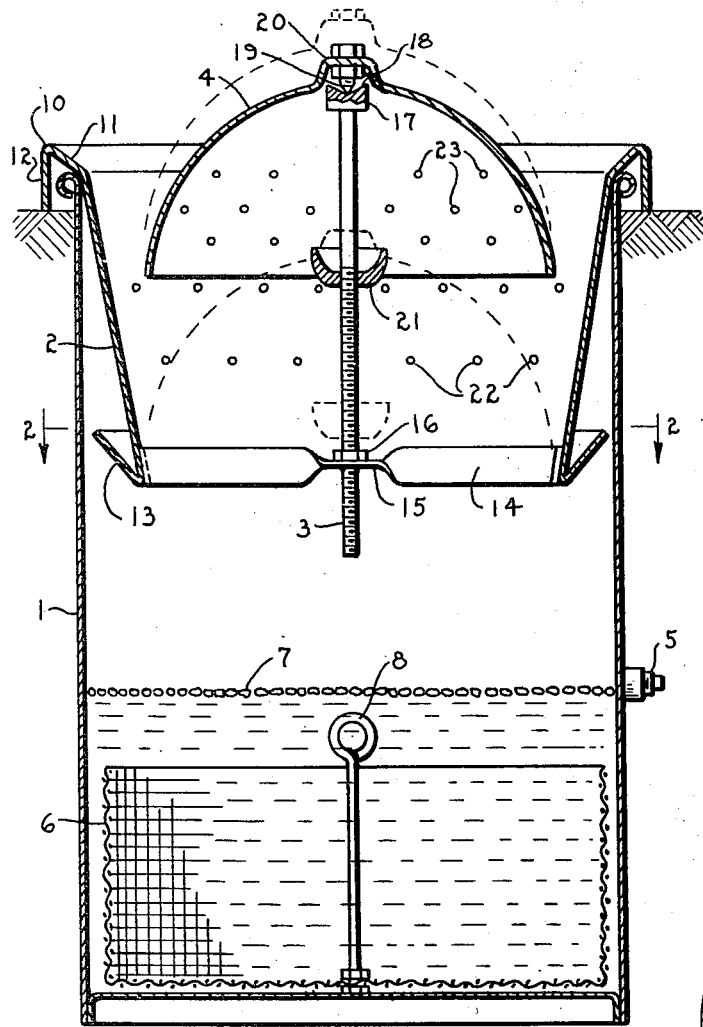
Fig.-1
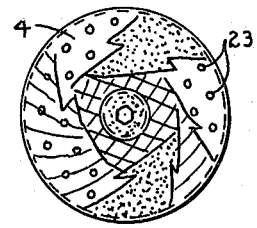
Fig.-3
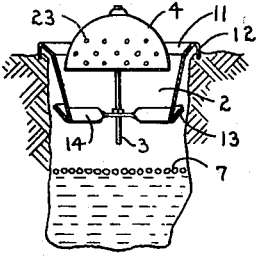
Fig.-7
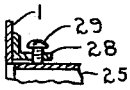
Fig.-8
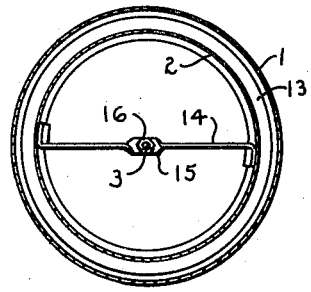
Fig.-2
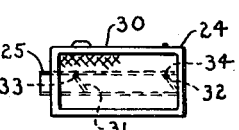
Fig.-6
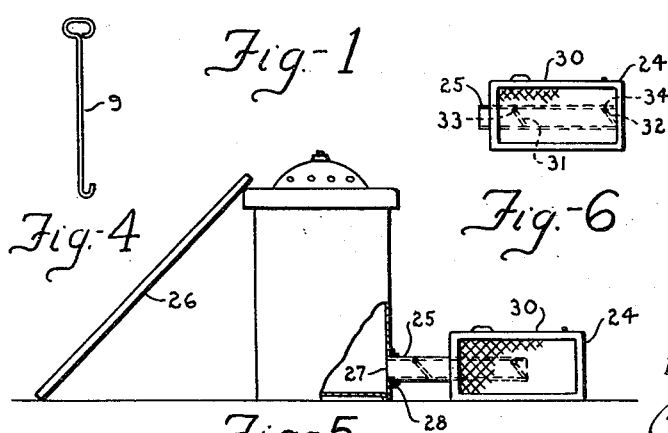
Fig.-4
Fig.-5
INVENTOR.
GLENN B. KELLY
&
BY   CARL E. KELLY
Charles S. Penfold
ATTORNEY

United States Patent Office 2,822,639
Patented Feb. 11, 1958

2,822,639

ANIMAL TRAP

Glen B. Kelly and Carl E. Kelly, Fort Wayne, Ind.

Application November 18, 1954, Serial No. 469,773

8 Claims. (Cl. 43—69)

This invention relates generally to traps for animals and more particularly is directed to a trap for rodents such as rats.

The trap embodying the invention has been thoroughly tested and proven successful in catching thousands of rats, and its success is due to its improved principles of design and construction.

More particularly in this respect, one of the principal objects of the invention is to provide a trap which automatically resets itself after a rat is caught.

Another object of the invention is to provide a trap assembly which can be readily installed or mounted on a container such as a metal barrel or in a pit provided in the soil near a rat infested area.

An important object of the invention is to provide a trap of a size for convenient handling and which requires little or no maintenance.

A particular object of the invention is to provide an assembly comprising a mounting preferably in the form of a tapered cylinder or shell, a spindle axially supported on the mounting, and a door preferably in the form of a hollow bell or dome mounted on the upper end of the spindle for universal movement for controlling the entry of a rat, other small animal or fowl into the mounting. This assembly is adapted for disposition so that the tapered shell is upright with its larger extremity constituting the top thereof. The spindle is disposed in a vertical position with the bell normally located in the upper larger extremity of the shell.

A specific object of the invention is to provide the upper extremity of the shell with abutment means for engaging the upper rim or edge of a metal container when the assembly is installed thereon or for engaging the surface of the soil about a pit when the assembly is disposed therein to suspend the assembly in the container or pit. The abutment means is preferably so designed and constructed that it will accommodate itself to containers of different diameters and at the same time assist in piloting a rat downwardly into the shell.

A significant object of the invention is to provide means whereby the spindle can be readily adjusted to locate the bell in any one of an infinite number of vertical positions in order that the size of the annular space between the periphery of the bell and the shell may be varied to set the bell for catching animals or fowl of different sizes. For example, if the trap is set to catch rats the bell will be located substantially in the position shown in the drawings but for catching animals such as red squirrels or weasels the bell will be adjusted to a lower position in the shell, and for catching mink or muskrat the bell will be set at a higher level.

An additional object of the invention is to provide an assembly in which the lower extremity of the mounting shell is provided with an outturned flange serving as a tray for bait and the spindle is provided with a receptacle for bait. The receptacle on the spindle is adjustable thereon for disposition with respect to the bell, and the mounting shell and bell are preferably provided with a plurality of small apertures or openings through which the aroma of the bait from the tray and receptacle may rise to attract animals in the vicinity of the trap.

Another object of the invention is to provide the exterior surface of the bell with a suitable finish for camouflaging it.

A further object of the invention is to provide a metal container, such as a barrel, with water therein of a depth to cover a wire basket and provide a layer of granulated cork or equivalent material on the surface of the water so as to conceal the basket from view and prevent rats knowing of the existence of the water. This is important as the cork is visible through the space about the bell. The basket facilitates removal of drowned rats. Obviously, any rat killing liquid other than just water may be used.

Another object of the invention is to provide a container such as a metal barrel or drum, with a cage which can be detachably connected to the container in the event one desires to catch animals in the live state. More particularly, the cage is provided with a tube or conduit which is slidably mounted on the cage for extension for connection with the container or for retraction substantially within the confines of the cage. The tube is preferably provided with a pair of similar trap doors which are so disposed that only one rat at a time can pass through the tube and so that no rat in the cage can prevent passage of rats through the tube.

Additional objects of the trap reside in its durability, efficiency of operation, and low cost of manufacture and assembly.

Other objects and advantages of the invention will become apparent after the description hereinafter set forth is considered in conjunction with the drawings annexed hereto.

In the drawings, wherein the preferred embodiment of the invention is illustrated:

Figure 1 is a vertical section of the trap showing the improved principles of design and construction thereof;

Figure 2 is a transverse section taken substantially on line 2—2 of Figure 1 illustrating certain details of construction;

Figure 3 is a top view of the bell with camouflage thereon;

Figure 4 is an accessory in the form of a device that can be used to lift or place the basket with respect to the container;

Figure 5 is a view showing a cage operatively connected with the container;

Figure 6 is a view depicting the cage and the tube thereof in a retracted position;

Figure 7 is a view exemplifying that the assembly above referred to can be placed in the pit in lieu of a container as shown in Figures 1 and 5; and Figure 8 is a partial sectional view showing one way of detachably connecting the cage with the container.

Referring more specifically to the drawings, the trap exemplified in Figure 1 comprises, among other things, a container 1, a mounting 2 supported on the container, a spindle 3 carried by the mounting and a hollow bell or dome 4 mounted for universal movement on the spindle. As will be pointed out more in detail subsequently, this trap may be considered a primary trap when operatively connected with a cage constituting a second trap.

The container 1 is preferably in the form of a cylindrical metal barrel or drum open at the top. The container may be partially filled with water as shown in Figure 1 and a drain or outlet 5 is provided in the side wall of the container. When the trap is used outside the open drain will maintain a predetermined depth of water or other liquid killing solution in the container sufficient to drown or kill rats as they fall into the container. When the trap is placed in a dwelling or outbuilding the drain is preferably plugged as shown.

A basket or bucket 6 is disposed in the container preferably below the water line and a layer of ground cork 7 or the equivalent is placed on the water for concealing the basket and camouflaging the water. The basket is provided with an upstanding rod having an eye 8 at its upper end so that a device 9 having a hook thereon as shown in Figure 4 may be utilized to lift and lower the basket with respect to the container.

The mounting 2, spindle 3 and bell 4 comprise an assembly or unit which is adapted for support on the container as shown in Figure 1 or in a pit provided in the soil as illustrated in Figure 7.

The mounting 2 may be constructed in various ways but as herein shown is made in the form of a tapered hollow cylinder or tubular shell having an upper relatively large extremity and a smaller lower extremity. The upper extremity is provided with abutment means 10 comprising an inclined portion 11 and a depending flange 12. The upper extremity and the abutment means are so formed that the inclined portion 11 will bear against the upper marginal edge of the container and the depending flange will surround this edge in concentric relation to the container. The inclined portion serves to prevent a rat from obtaining a foothold on the trap and also assists in piloting the rat into the trap when it places its weight on the bell or dome. The inclined portion further serves to compensate for containers of variable cross-sectional dimensions.

The lower or smaller extremity of the mounting shell is preferably provided with an outward angularly disposed annular flange 13 which serves as a tray for food, the tray being located between the mounting and the container. The lower extremity of the mounting is also provided with an elongated member 14 extending diametrically cross-wise of the mounting. The ends of this member are offset and welded or otherwise secured to the inner surface of the mounting. This support member or brace is preferably located so that its plane is vertical in order that any rat or other animal falling into the trap cannot obtain a foothold or rest on the member. This member has a center horizontal portion 15 provided with an opening and a nut 16 is secured to the portion in registry with the opening. The spindle support for the bell extends through the opening and is threadedly connected to the nut for rotation so that it can be readily moved upwardly or downwardly as desired. The upper end of the spindle is preferably provided with a bearing 17 having a V-shaped pocket or seat 18 therein for receiving the pointed end of a set screw 19 detachably secured to a raised portion 20 of the bell as shown in Figure 1.

The bell or dome may be designed and constructed in various ways but as shown is preferably a hollow inverted semi-spherical cup, the diameter of which is somewhat less than the internal diameter of the upper end of the larger extremity of the mounting shell so as to provide a round trough or annular space through which a rat or other animal enters the trap. As shown in Figure 1, the bell can be raised or lowered by merely manipulating the spindle. With this unique arrangement the size of the annular space or trough between the bell and the mounting can be readily varied to set the trap for animals of different sizes. The exterior surface of the bell is preferably provided with suitable camouflage as shown in Figure 3. To facilitate storage and/or packaging the bell can be lowered to the nested position in the shell as shown by the dashed line in Figure 1.

A receptacle 21 for food is threadedly connected to the spindle for adjustment along the spindle as illustrated by the full and dotted lines in Figure 1.

The mounting shell 2 is preferably provided with a plurality of openings 22 and the bell with a plurality of openings 23 so that the aroma from the bait in the tray and receptacle will rise upwardly from the trap and attract rats thereto.

Attention is directed to the important fact that the connection between the spindle and bell is very sensitive so that any weight or force applied to the bell at a location apart from the connection will cause the bell to readily tilt and when the force is removed, the bell will automatically right or reset itself. The bell is mounted for free rotary and/or tilting movement without utilizing weights or springs for normally maintaining the bell in a horizontal operative position.

As shown in Figures 1 and 7, the assembly can be installed in a pit with or without the container. The pit and container provide different forms of supports for the trap assembly. When used as in Figure 7, and for example in a swampy area where the water table is quite stable, ground cork or the equivalent is spread on the water, and after a sufficient number of rats have been caught, it is merely necessary to remove the assembly and throw some soil in the pit to cover them.

Referring now to the modified structure illustrated in Figure 5 of the drawing, there is shown a cage constituting a second trap when operatively connected to the container of the primary trap by means of a tube or conduit 25 slidably and rotatably carried by the cage. The container supports the trap assembly above referred to and in some instances a board 26 is laid against the container in an inclined position so as to provide a run-way leading to the top of the trap. The side wall of the container is provided with an opening 27 into which the outer end of the tube 25 extends. This end of the tube can be detachably connected to the container in any manner desired, but as shown in Figure 8 is preferably connected thereto by forming a lug 28 on the side wall of the container adjacent the opening and providing the lug with a screw 29 for engaging and locking the tube in place. If found desirable, the lug and screw could be provided on the tube, in which event, the screw would connect with a threaded hole in the container.

The second trap is preferably made in the form of a container or cage having a hinged closure 30 for access thereto. The tube is provided with a pair of corresponding vane-like doors 31 and 32 which are pivotally mounted at points 33 and 34. These doors are disposed in parallel relation at substantially 45 degree angles to the horizontal and so spaced apart that once a rat finds itself between the doors will naturally open the door 32 and after passing therebeyond will be caught in the cage. In other words, a rat will successively move the doors 31 and 32 aside when passing from one trap to the other. When all of the rats are in the second trap the tube can be disconnected from the container and then retracted into the cage as shown in Figure 6, after which the cage with the rats therein can be carried away. An animal can be readily released from the cage by merely sliding the tube outwardly to some extent and then rotating it until the doors 31 and 32 automatically swing downwardly to provide an unobstructed passage to permit the animal to pass therethrough.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

We claim:

1. A trap assembly comprising a tubular shell, a support carried by the shell and disposed therein, a vertical spindle carried by the support and located centrally in the shell, an annular inverted cup member mounted on the spindle for tiltable movement with respect thereto for controlling entry of a creature into the shell and having a peripheral edge depending an appreciable distance into the shell, and a receptacle for bait carried by the spindle and located between the support and member.

2. An animal trap comprising a tubular shell provided with means at its upper extremity for supporting the shell with respect to a mounting, a cross support carried by the lower extremity of the shell, a vertical spindle carried by the support and centered thereby vertically in the shell, a dome mounted on the upper extremity of the spindle for tiltable movement with respect thereto, a receptacle for bait carried by the spindle and located between the dome and support, said shell being tapered so that its upper extremity is of a larger cross-dimension than its lower extremity, said dome having a cross-dimension approximating the cross-dimension of the lower extremity of the shell, and means for adjusting the spindle vertically to raise or lower the dome in order to vary the size of the space between and within the confines of the dome and shell at a location appreciably below the upper end of the shell.

3. The structure defined in claim 1, including the provision of means affording vertical adjustment of the spindle on the support and vertical adjustment of the receptacle on the spindle.

4. The structure defined in claim 1, in which the tubular shell is tapered and provided with a circular tray for food, and with apertures through which aroma from food placed in the tray may circulate.

5. The structure defined in claim 1, in which the cup member is provided with camouflage and also with apertures through which aroma from food placed in the receptacle may circulate.

6. The structure defined in claim 1, including a container on which the trap assembly is supported in a substantially depending position, and a removable basket located in the container below the trap assembly for receiving creatures as they fall downwardly between the cup member and shell.

7. The structure defined in claim 1, including a container containing a liquid with the trap assembly supported on the container in a substantially depending position, and a removable basket located below the trap assembly for receiving creatures after drowning.

8. The structure defined in claim 1, in which the upper end of the shell is provided with external flange means for supporting the trap assembly in a depending position substantially within the confines of a container or pit.

References Cited in the file of this patent
UNITED STATES PATENTS

| | | |
|---|---|---|
| 741,935 | Schickerling | Oct. 20, 1903 |
| 1,366,049 | Bailey | Jan. 18, 1921 |
| 1,395,680 | Kasprzyk | Nov. 1, 1921 |
| 1,438,816 | Fairbanks | Dec. 12, 1922 |
| 1,547,472 | Vandiver | July 28, 1925 |
| 1,557,558 | Cherbonnier | Oct. 20, 1925 |
| 1,987,299 | Karper | Jan. 8, 1935 |
| 2,260,507 | Campbell | Oct. 28, 1941 |
| 2,565,142 | Mattingley | Aug. 21, 1951 |

FOREIGN PATENTS

| | | |
|---|---|---|
| 10,146 | Great Britain | 1890 |
| 106,695 | Germany | 1899 |
| 526,444 | Great Britain | 1940 |